United States Patent [19]
Nakamoto et al.

[11] Patent Number: 5,683,178
[45] Date of Patent: Nov. 4, 1997

[54] APPARATUS FOR PRODUCING HIGH VISCOSITY MATERIALS AND METHOD OF PRODUCING THE SAME

[75] Inventors: Hidekazu Nakamoto; Chikao Oda; Norio Nakazato; Morihisa Maruko, all of Kudamatsu; Kazuo Ihara, Tokuyama; Takatoshi Kinoshita, Kudamatsu; Tokinobu Furukawa, Kudamatsu; Kenichi Watanabe, Kudamatsu, all of Japan

[73] Assignee: Hitachi, Ltd., Tokyo, Japan

[21] Appl. No.: 108,820

[22] Filed: Aug. 18, 1993

Related U.S. Application Data

[63] Continuation of Ser. No. 831,751, Feb. 10, 1992, abandoned, which is a continuation of Ser. No. 471,503, Jan. 29, 1990, abandoned.

[30] Foreign Application Priority Data

| Feb. 3, 1989 | [JP] | Japan | 1-23877 |
| Feb. 3, 1989 | [JP] | Japan | 1-23878 |
| Sep. 8, 1989 | [JP] | Japan | 1-231607 |

[51] Int. Cl.⁶ .................................................. B01F 7/32
[52] U.S. Cl. .................... 366/325.3; 366/325.94; 366/329.2; 416/227 R
[58] Field of Search .............................. 366/292, 309, 366/328, 329, 343, 328.4, 328.3, 328.1, 329.3, 329.2, 329.1, 325.94, 325.3, 328.2; 416/200 R, 201 A, 227 R, 427

[56] References Cited

U.S. PATENT DOCUMENTS

| 1,461,468 | 7/1923 | Trust et al. | 366/343 |
| 1,607,345 | 11/1926 | Harding et al. | 366/312 |
| 1,708,493 | 4/1929 | Brinkley | 366/329 |
| 2,689,113 | 9/1954 | Merrill | 366/309 |
| 2,810,557 | 10/1957 | Phelan | 416/227 R |
| 3,226,097 | 12/1965 | Yayda et al. | 366/292 |
| 3,820,761 | 6/1974 | Rigal | 416/227 R |
| 3,877,881 | 4/1975 | Ono et al. | 366/312 |
| 4,274,751 | 6/1981 | Rector et al. | 366/310 |
| 4,460,278 | 7/1984 | Matsubara et al. | 366/310 |

OTHER PUBLICATIONS

Perry's Chemical Engineers' Handbook, 5th ed., 1973, pp. 19-14 to 19-17.

*Primary Examiner*—Thomas R. Weber
*Attorney, Agent, or Firm*—Antonelli, Terry, Stout & Kraus, LLP.

[57] ABSTRACT

Agitator blades formed by connecting a plurality of frame members are provided in a cylindrical or conical container to realize the agitator blade structure without rotary shaft. Therefore, less liquids being treated adhere onto the rotary shaft or the agitator blades and less residue of the liquids is formed, making it possible to obtain a final high viscosity polymer using the same agitator vessel preventing the quality from being deteriorated.

15 Claims, 14 Drawing Sheets

FIG. 15
FIG. 16
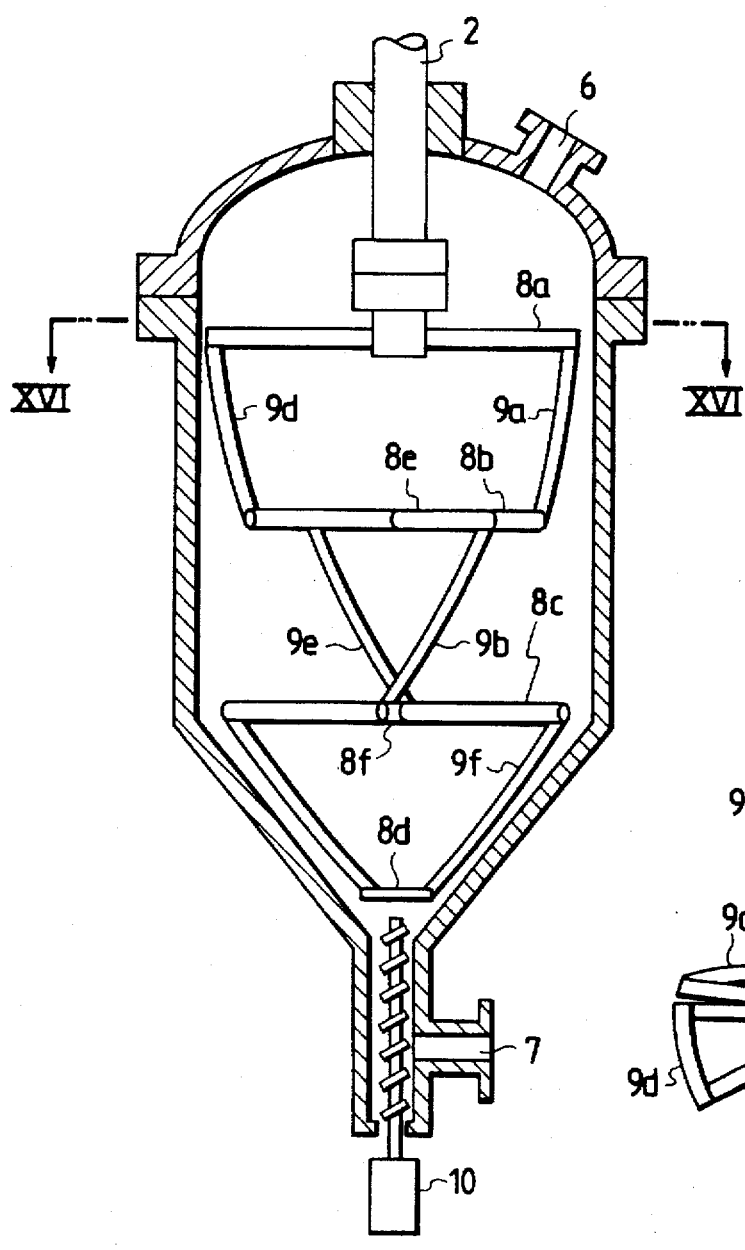
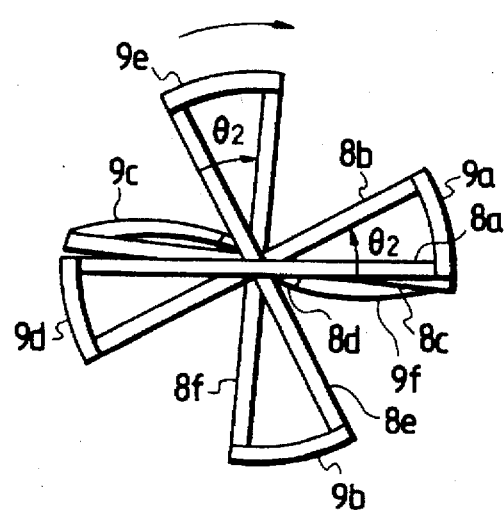

APPARATUS FOR PRODUCING HIGH VISCOSITY MATERIALS AND METHOD OF PRODUCING THE SAME

This application is a continuation of application Ser. No. 07/831,751, filed Feb. 10, 1992, abandoned, which is a continuation of application Ser. No. 07/471,503, filed on Jan. 29, 1990, now abandoned.

BACKGROUND OF THE INVENTION

1. (Field of the Invention)

The present invention relates to the production of high viscosity materials suited for the production of high performance engineering plastics such as liquid crystal plastics and polyacrylates.

2. (Description of the Prior Art)

In producing highly viscous materials by kneading and reacting them together, in general, many contrivances have been proposed to prevent the liquids being treated from adhering onto the apparatus, from rotating together with rotational shafts and agitator blades in the apparatus, and to decrease residues of the liquids so that the quality will not be deteriorated. For example, Japanese Patent Laid-Open No. 116721/1981 and a literature entitled "Basics and Analysis of the Polymerization Reaction Apparatus", by Yasuhiro Murakami, pp. 33–37, teach structure in which ribbon blades are so arranged as to scrape off the whole inner surface of the vessel. This structure which is realized using a cylindrical container will now be described with reference to FIG. 24. In FIG. 24, the force of agitation is transmitted to a rotary shaft 5 of an agitator vessel body 1 from the drive source via a rotational force transmission shaft 2 (hereinafter referred to as rotational lug shaft). A plurality of support arms 4a, 4b are attached in a horizontal direction to the rotary shaft 5, and helical ribbon blades 3a, 3b are attached to the ends of the support arms 4a, 4b so as to evenly scrape off the inner wall of the agitator vessel body 1. The agitator vessel body 1 has at its upper portion a feed port 6 for introducing the treated liquids from a prepolymerization apparatus 23 and for introducing addition agents, and has at its lower portion a drain port 7 for draining the treated liquids. In agitating and mixing highly viscous solutions using this apparatus, the operation can be favorably carried out so far as the viscosity of the treated liquid lies from several hundred to 1 kpa·s (several thousand to ten thousand poises). As the viscosity of the treated liquid reaches to several kpa·s (several tens of thousand poises), however, the treated liquid adheres onto the ribbon blades 3a, 3b and rotates together therewith. Further, the rotary shaft 5 has a low peripheral speed which permits the treated liquid to adhere thereto and rotate together therewith as the viscosity becomes high. Therefore, a dead space develops resulting in a deterioration the agitating and mixing performance. Using the conventional apparatus, therefore, the liquid can be treated provided its viscosity does not exceed 1 kpa·s (10,000 poises). If the viscosity becomes greater than the above value, an extended period of time is required for the agitation, and quality of the treated product decreases due to the dead space.

Furthermore, general-purpose plastics have heretofore been produced by the polymerization reaction process that is taught in the literature "Basics and Analysis of the Polymerization Reaction Apparatus", by Yasuhiro Murakami, pp. 137–140. The following problems, however, arouse when the high performance engineering plastics are to be produced by the above-mentioned process. Imparting high performance to the plastics may be, for example, to increase the mechanical strength, to increase the heat resistance, and to improve resistance against weather and chemicals. Generally, however, to impart high performance means to increase the polymerization degree of the resin, i.e., to increase the molecular weight. An increase in the molecular weight of the resin results in an increase in the melting viscosity thereof.

The viscosity of 1 kpa·s (10,000 poises) is an upper limit that can be treated by the agitator used in the conventional production processes. Therefore, high performance resins (super engineering plastics) have been produced by a process that is shown in FIG. 26. A conventional process will now be described with reference to FIG. 26. A monomer which is a starting material of a resin and a catalyst are added up together to prepare starting materials, followed by the addition of a solvent of resin. The mixture is then supplied in a liquid state of low viscosity into the agitating vessel where it is agitated maintaining a predetermined reaction temperature to carry out the solution polymerization. The polymerization by-products formed by the accompanying reaction are removed at all times. The molecular weight of the resin increases with the progress in the reaction. However, since the resin is agitated in the solvent, the viscosity of the solution does not increase but is maintained at about several hundred pa.s (several thousand poises). As the reaction proceeds and a predetermined polymerization degree is reached, the solvent must then be recovered. The step of recovering solvent employs a devolatile apparatus, a dehydration apparatus and a drying apparatus, and where a final polymer only is obtained that is separated from the solvent.

Described below with reference to FIG. 27 is another method of producing a high performance resin (super engineering plastics). In this process, a catalyst is added to a monomer which is a starting material of a resin, and the mixture is supplied into the agitator vessel. The agitation and mixing are carried out while maintaining the agitation vessel at a predetermined reaction temperature and under a predetermined atmosphere condition. Polymerization by-products formed by the accompanying the reaction are removed at all times, whereby the molecular weight of the resin increases with the progress of the reaction, the viscosity of the liquid increases to establish a bulky state as it is agitated and treated and the bulk polymerization is realized. As the reaction proceeds, furthermore, the treated liquid exhibits a limit viscosity that can no longer be treated by the agitator apparatus. The intermediate polymer that has reached the limiting viscosity is discharged out of the agitator vessel, and the temperature of the treated liquid is decreased to be lower than its melting point. The liquid is thus solidified and is transformed into chips. The chip-like intermediate polymer is supplied to another agitator apparatus and is agitated under a predetermined atmosphere condition such that the polymerization reaction proceeds further. The final polymer is produced through this solid phase polymerization reaction.

The agitator apparatus used for the solution polymerization and bulk polymerization in the conventional production process is constituted by the prepolymerization apparatus 23 and the polymerization apparatus 25 as shown in FIG. 24. The prepolymerization apparatus 23 is provided with agitator blades 24 for low viscosities. The prepolymerization apparatus 23 chiefly treats liquid having low viscosity such as agitating and mixing the starting material and the catalyst together, and the agitator blades 24 for low viscosity are made up of turbine blades or paddle blades. The liquid which is pretreated by the prepolymerization apparatus 23, prior to effecting the polymerization, is then supplied to the polymerization apparatus 25. Here, predetermined reaction conditions are set to proceed the polymerization reaction. The agitator blades 3a, 3b for intermediate viscosity employed in the polymerization apparatus 25 are, usually, made up of ribbon blades capable of dealing with from several hundred pa.s to 1 kpa·s (several thousand poises to 10,000 poises). The polymer treated by the polymerization apparatus 25 up to a predetermined polymerization degree is then sent to the next step according to the aforementioned process.

According to the above-mentioned prior art, no attention has been given with regard to agitating and mixing the highly viscous materials. Therefore, the liquid adheres conspicuously as the viscosity increases and is hence fluidized by the agitation only at the portions of the ribbon blades that have a large shearing action; i.e., the liquid is almost not fluidized at the central portion of the agitator vessel to where no shearing force is imparted. As the viscosity of the liquid to be treated further increases, the liquid adheres to the surfaces of the ribbon blades with a force which is greater than the shearing force of the agitation. Accordingly, the liquid to be treated adheres to the surfaces of the ribbon blades and rotates together with the rotational shaft and the agitator blades. Consequently, agitation and mixing become poor, the liquid adheres on the agitating shaft that receives little shearing force, the adhered matter loses its quality and is further agitated and mixed together with other material to be treated to deteriorate the quality of the product. Moreover, the conventional apparatus can treat liquids having a viscosity of up to about 1 kpa·s (10,000 poises) and requires the use of other apparatus for treating highly viscous materials, resulting in complex process for producing high performance resins and requiring extended periods of production time.

SUMMARY OF THE INVENTION

The object of the present invention is to provide an apparatus for producing high viscosity materials which is capable of decreasing the residues of the liquid to be treated contributing to improving quality.

Another object of the present invention is to simplify the production process by using an agitator apparatus capable of treating highly viscous liquids for the production of high performance resins.

A further object of the present invention is to simplify the apparatus for producing high performance resins in order to decrease the cost of the apparatus.

A still further object of the present invention is to provide an apparatus and method of producing polycondensation-type high molecular materials capable of improving surface renewing performance by promoting the circulation flow in the container.

Yet a further object of the present invention is to provide an apparatus and a method of producing addition polymerization-type high molecular materials capable of removing the heat of polymerization at an increased rate by using the apparatus of the present invention which promotes the conduction of heat in the container.

BRIEF DESCRIPTION OF THE DRAWINGS

FIG. 15 is a schematic cross-sectional view of an apparatus for producing high viscosity materials according to a further embodiment of the present invention;

FIG. 16 is a section view along the line XVI—XVI of FIG. 15;

DESCRIPTION OF THE EMBODIMENTS

Figure 1:
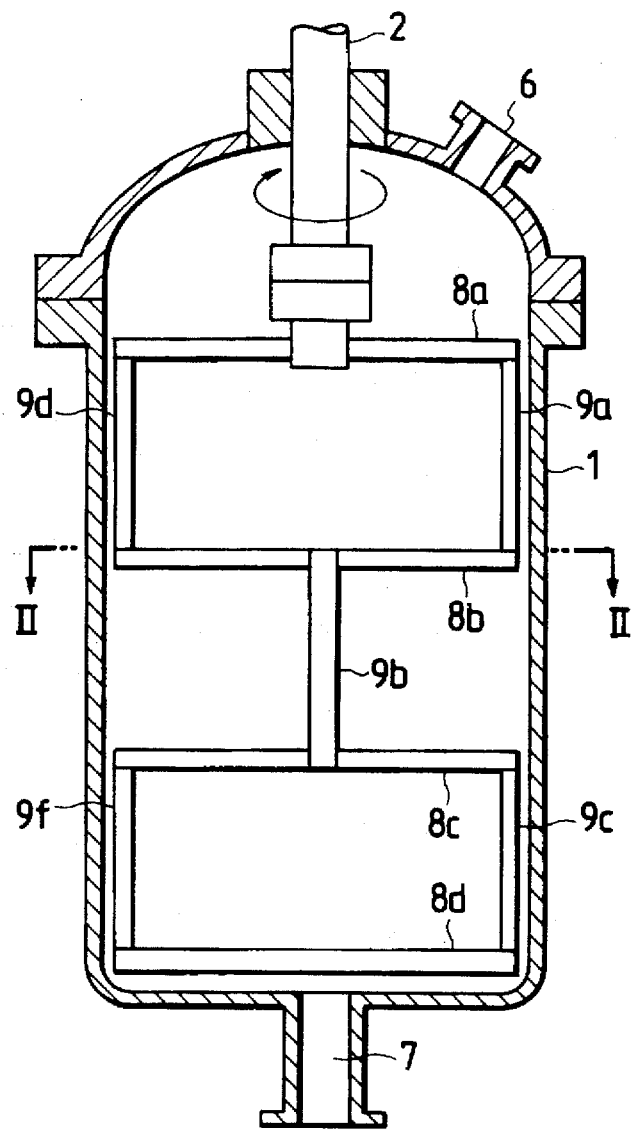
FIG. 1 is a schematic cross-sectional view of an apparatus for producing high viscosity materials according to a first embodiment of the present invention.
Figure 2:
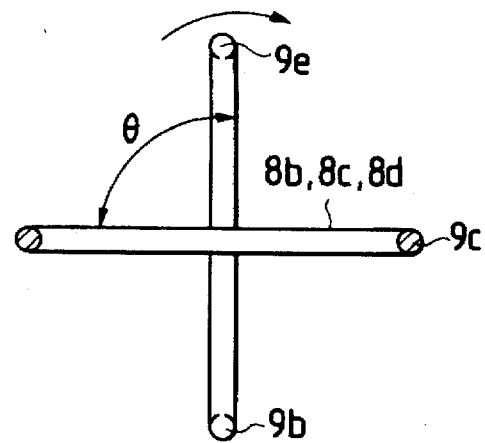
FIG. 2 is a section view along the line II—II of FIG. 1.

An embodiment of the present invention will now be described in conjunction with FIGS. 1 and 2, wherein an agitator vessel body 1 is a cylindrical container having a circular cross section and is provided with a heat transfer jacket of which the outer side can be heated and cooled. Agitator blades are constituted by bar shaped rectangular frames in which a rotational force transfer shaft (hereinafter referred to as rotational lug shaft) 2 and agitator blade members 8a, 8b, 8c, 8d, 9a, 9b and 9c are combined together, with the frames being connected together and maintaining an angle of θ degrees relative to one another to form an agitator blade constituent element (lattice blade). According to this embodiment as shown in FIG. 2, the angle θ is selected to be 90 degrees. The angle θ, however, may be freely selected. The agitator blade members 8a, 8b, 8c, 8d, 9a, 9b, 9c, 9d and 9f consist of round rods or plate-like members.

Rotational force is transmitted from the rotational lug shaft 2 to the agitator blade member 8a. The bar rectangular frame constituted by the agitator blade members 8a, 8b, 9a and 9d rotates along the inner wall of the agitator vessel body 1 to agitate and mix the liquids to be treated. The agitator blade members 8a, 8b, 8c and 8d, extending in a horizontal direction, rotate in the horizontal direction in the vessel to contribute to effecting the agitation and mixing in the radial direction. The agitator blade members 9a, 9d, 9b, 9c, 9e and 9f in the vertical direction evenly scrape the wall surface of the vessel to eliminate residues in the liquids being treated. The rectangular agitator blade element and the next rectangular agitator blade element are mounted so as to maintain an angle θ relative to each other and, then, a next rectangular agitator blade element is further mounted for maintaining an angle θ relative thereto. Highly viscous liquids are agitated and mixed using agitator blade members 8a, 8b, 8c, 8d of the horizontal direction and agitator blade members 9a, 9b, 9c, 9d, 9e and 9f of the vertical direction. Therefore, the blade members are located at every position in the vessel to agitate the liquids in a complex manner whereby the ratio of surface area of the liquid to be treated increases relative to the volume of the vessel. This means that gases of volatile substances can be efficiently removed in the polymerization reaction operation. Furthermore, since there is no rotary shaft, the highly viscous material does not adhere, and the agitation and mixing are effected favorably. In this embodiment round rods were used for the agitator blade members 9a, 9b, 9c, 9d, 9e and 9f; however, the same effects are obtained even with plate-like members.

Figure 3:
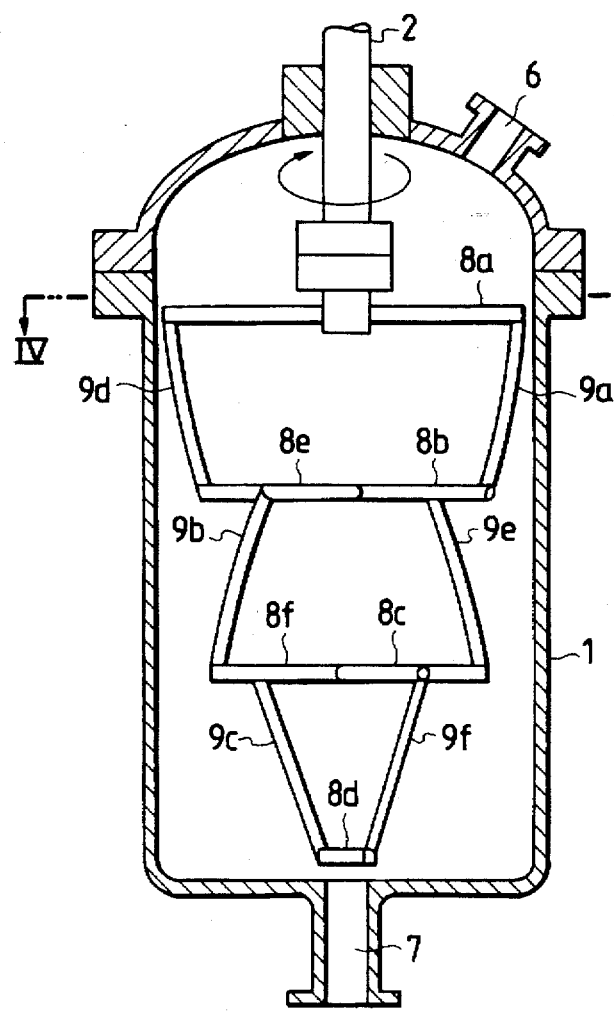
FIG. 3 is a schematic cross-sectional view of an apparatus for producing high viscosity materials according to another embodiment of the present invention.
Figure 4:
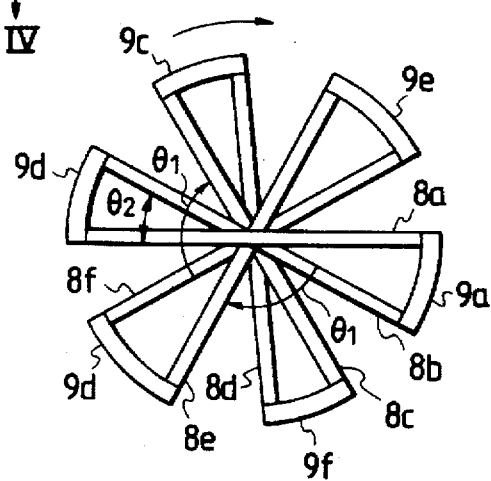
FIG. 4 is a section view along the line IV—IV of FIG. 3.
Figure 5:
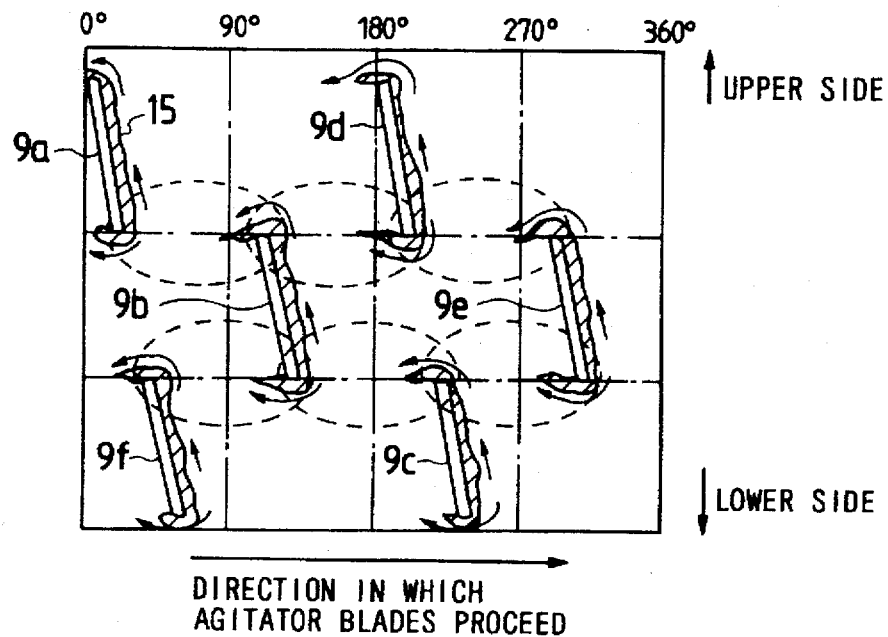
FIG. 5 is an expansion plan view of the circumferential wall surface of a cylinder of FIG. 3.
Figure 24:
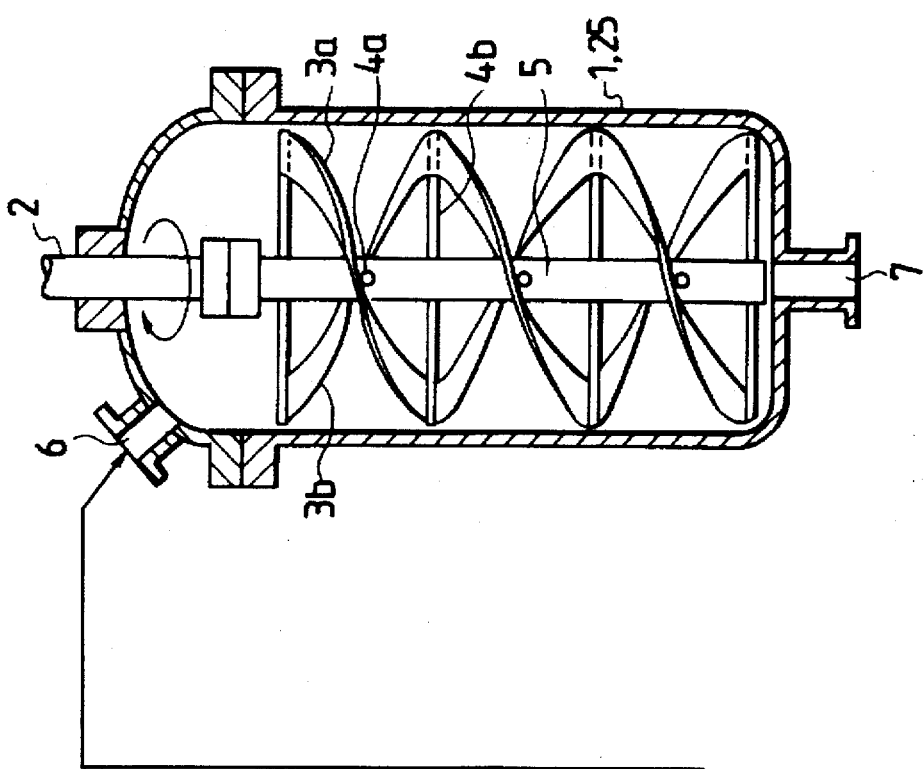
FIG. 24 is a schematic partial cross-sectional view of a conventional apparatus for producing high viscosity materials.
Figure 24:
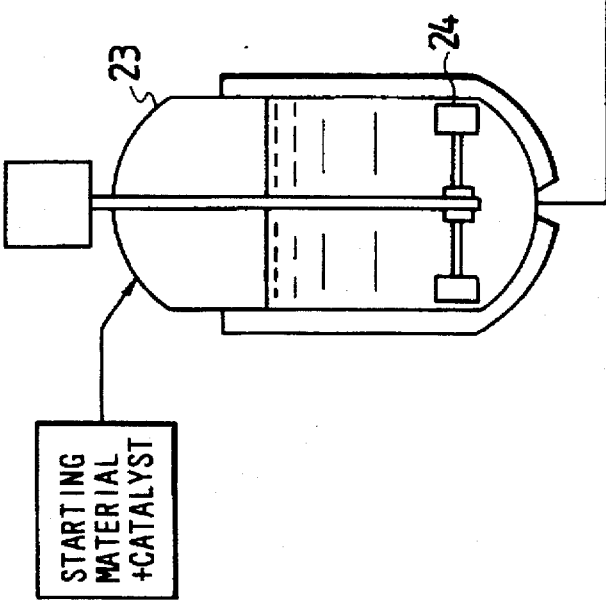
Figure 25:
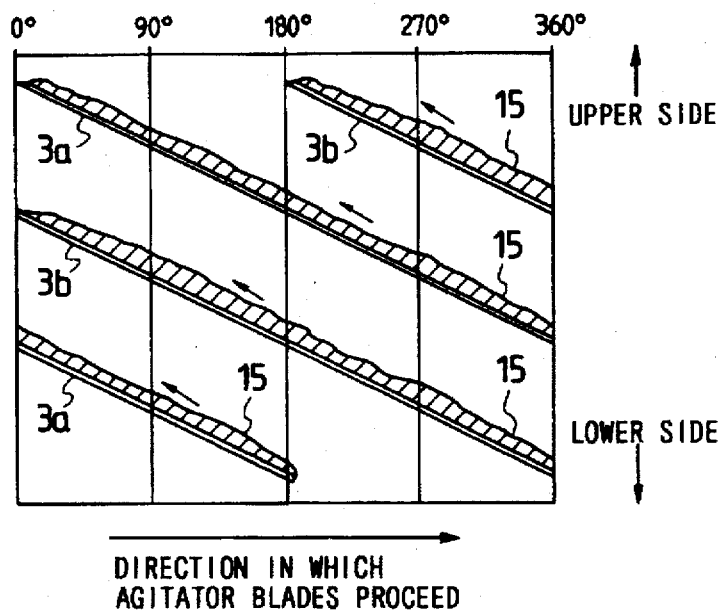
FIG. 25 is an expansion plan of the circumferential wall surface of a cylinder of FIG. 24.
Figure 26:
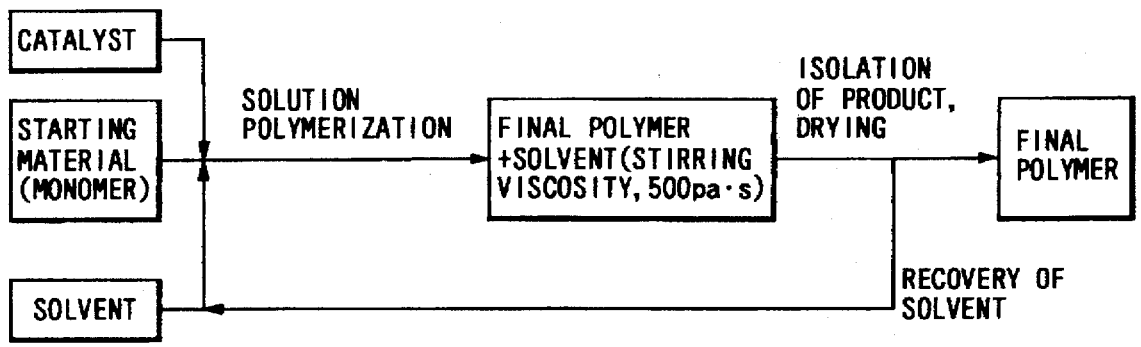
FIGS. 26 and 27 are flow diagrams related to conventional production processes.
Figure 27:
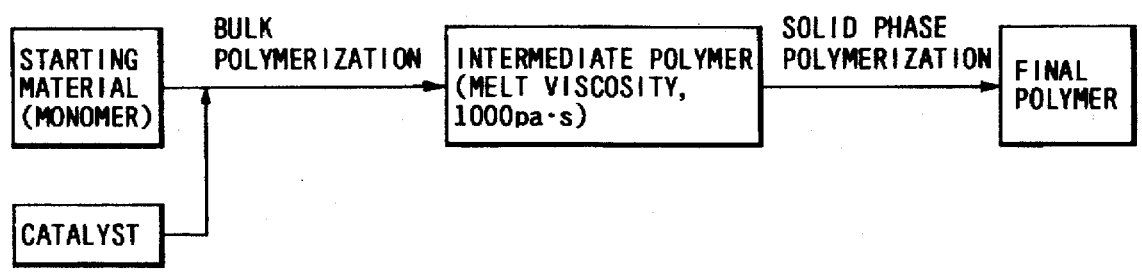

In the embodiment of FIGS. 3 and 4, the agitator vessel body 1 is a cylindrical container having a circular cross section and is provided with a heat transfer jacket of which the outer side can be heated and cooled. Agitator blades constitute a bar rectangular frame in which a rotational lug shaft 2 and agitator blade members 8a, 8b, 9a and 9d are combined together to form an agitator blade constituent element (lattice blade). Among the agitator blade constituent elements, the agitator blade members 8a and 8b which are provided in a horizontal direction are positioned in the rotational direction twisted by $\theta_2$ with the center of the vessel as a center of rotation, and are coupled to the agitator blade members 9a and 9d of the vertical direction that are so formed as to evenly scrape the wall surface of the vessel. The next agitator blade constituent element has the same shape and in which the agitator blade members 8b and 8e in the horizontal direction are coupled together maintaining an angle $\theta_1$. The next agitator blade constituent element is mounted for maintaining the same angle to form an agitator blade. FIGS. 3 and 4 illustrate a mounting angle $\theta_1$ of 90 degrees; however, the angles $\theta_1$ and $\theta_2$ may be freely selected. The agitator blade members 8a, 8b, 8c, 8d, 8e, 8f, 9a, 9b, 9c, 9d, 9e and 9f consist of round rods or plate-like members. Rotational force is transmitted from the rotational lug shaft 2 to the agitator blade member 8a. The bar rectangular frame constituted by the agitating blade members 8a, 8b, 9a and 9d rotates along the inner wall of the agitator vessel body 1 to agitate and mix the liquids to be treated. The agitator blade members 8a and 8b, extending in the horizontal direction, rotate in the horizontal direction in the vessel to contribute to effecting the agitation and mixing in the radial direction. The agitator blade members 9a and 9d rotate along the wall surface in the vessel to scrape the wall surface, and are mounted ahead of the agitator blade members 8a and 8b maintaining a phase $\theta_2$ in the direction of rotation. When rotated, therefore, the agitator blade members 9a and 9d produce force to upwardly scrape the liquid to be treated near the wall surface of the vessel. As the agitator blade constituent element rotates, therefore, an upward stream of the liquid along the periphery of the vessel and a downward stream at the center of the vessel are generated. Furthermore, the agitator blade constituent element is mounted for maintaining an angle $\theta_1$ relative to the next agitator blade constituent element. The next agitator blade constituent element is coupled together similarly to form an agitator blade. Due to these agitator blade constituent elements, therefore, a stream near the wall surface of the vessel heading from the lower portion to the upper portion of the vessel and a stream in the center of the vessel heading from the upper portion to the lower portion of the vessel are generated. Namely, a circulation stream generates in the entire vessel eliminating the residues in the liquid to be treated and making it possible to obtain favorable agitation and mixing. Described below with reference to FIG. 5 is the stream of the liquid to be treated near the wall surface of the vessel of the agitator apparatus according to this embodiment. The present invention is adapted to the case where the liquid to be treated has a viscosity as great as several tens of thousand poises. In FIG. 5, the agitator blade members 9a, 9d, 9b, 9e, 9f and 9c of the bar rectangular frames have a rotational phase angle $\theta_2$, and are rearwardly inclined relative to the direction in which the agitator blades proceed. When the agitator blades are rotated under this condition, a mass of liquid 15 to be treated is formed in front of the agitator blade member 9a. As the agitator blades rotate, the mass of liquid is upwardly pushed as a whole. At this moment, the liquid 15 has been mixed in front of the agitator blade member 9a. In this embodiment, the agitator blade members 9a, 9d, 9b, 9e, 9f and 9c have been distributed in the vessel. Therefore, the liquids mixed by, for example, the agitator blade member 9b partly overflows rearwardly beyond the upper and lower ends of the agitator blade member. Part of the liquid that has overflowed meets and mixes into the liquids that are being agitated and mixed by the succeeding agitating blade members 9a and 9f, and contributes to improving the homogeneous agitation and mixing performance of the whole vessel. In a conventional apparatus shown in FIGS. 24 and 25 ribbon agitator blades 3a, 3b are continuously installed in the vessel. With the conventional agitator blades, therefore, the liquids to be treated are mixed and agitated only in front of the agitator blade members 3a, 3b, and the are as a whole is upwardly pushed so as to be agitated. The adhering force of the liquids increases with the increase in the viscosity, and the liquids adhere onto the surfaces of the agitator blades 3a, 3b and move little upwardly. Namely, the liquids rotate together with the rotational shaft and the agitator blades to deteriorate the agitating and mixing performance. In the system of FIG. 5, the agitator blades are divided and the liquids hardly rotate together with the agitator blades. Furthermore, since the agitator blade members are uniformly distributed in the whole vessel, the liquids to be treated are agitated in a complex manner and the ratio of the surface area of liquids increases relative to the volume of the vessel, enabling gases of volatile substances to escape efficiently and the reaction time to be shortened in the polymerization reaction operation. Furthermore, since there is no rotary shaft, no residue of the highly viscous material is formed, and favorable agitation performance is obtained. While the embodiment of FIGS. 4 and 5 has been described in connection with round rods for the agitator blade members, the same effects are also obtained even when plate-like members are used.

Figure 6:
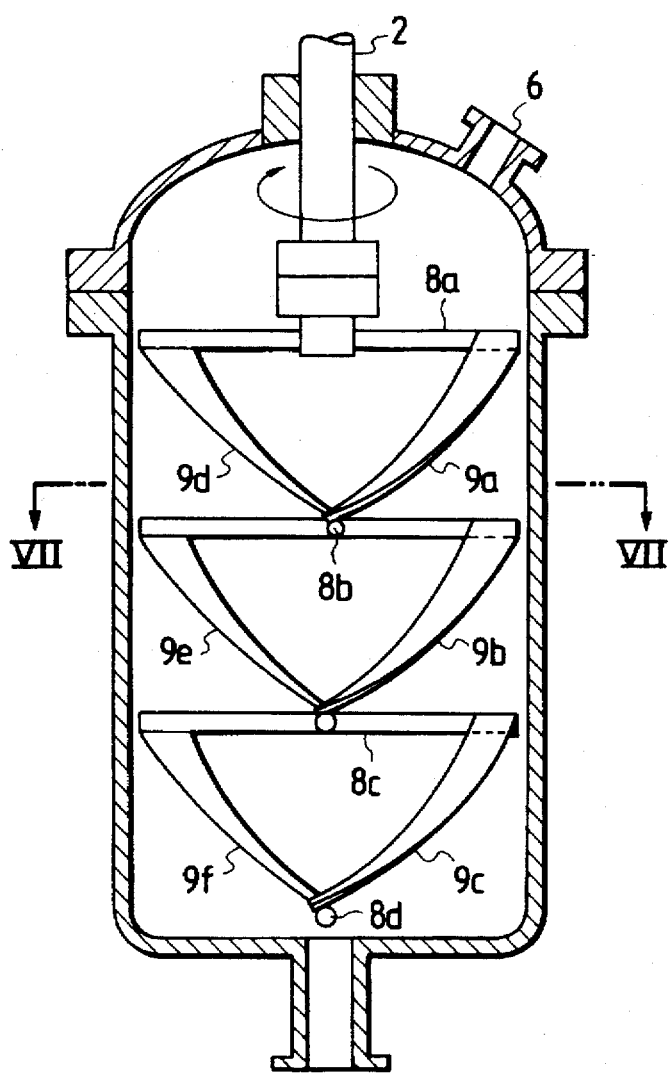
FIG. 6 is a schematic cross-sectional view of an apparatus for producing high viscosity materials according to a further embodiment of the present invention.
Figure 7:
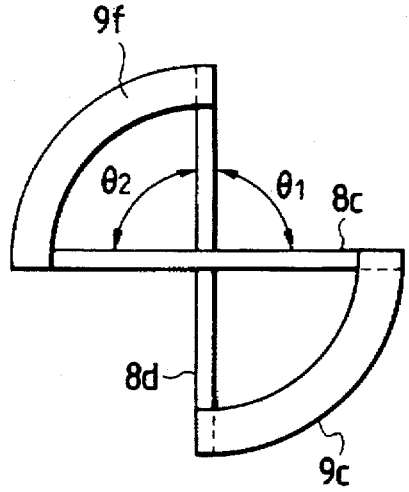
FIG. 7 is a section view along the line VII—VII of FIG. 6.

According to the embodiment of FIGS. 6 and 7, the basic constituent members and the operation are the same as those of the aforementioned embodiment, and the same effects are obtained. In the embodiment of FIGS. 6 and 7, the agitator blade constituent members $8a$ and $8b$ of the agitator blade constituent element are mounted for maintaining an angle $\theta$ of 90 degrees. Further, the agitator blade constituent members $9a$ and $9d$ are plate-like ribbon blades, and the agitator blade constituent element is coupled for maintaining an angle $\theta_1$ of 90 degrees to form an agitator blade. Since ribbon blades are meed as the agitator blade constituent members, the liquids are strongly scraped, whereby a strong circulation flow is obtained in the whole vessel and favorable mixing and agitating effects are obtained. Further, since the ribbon blades are discretely arranged along the wall surface of the vessel, the liquids adhere to the agitator blades in lesser amounts than when the ribbon blades are continuously formed, and improved agitating and mixing performance is obtained.

Figure 8:
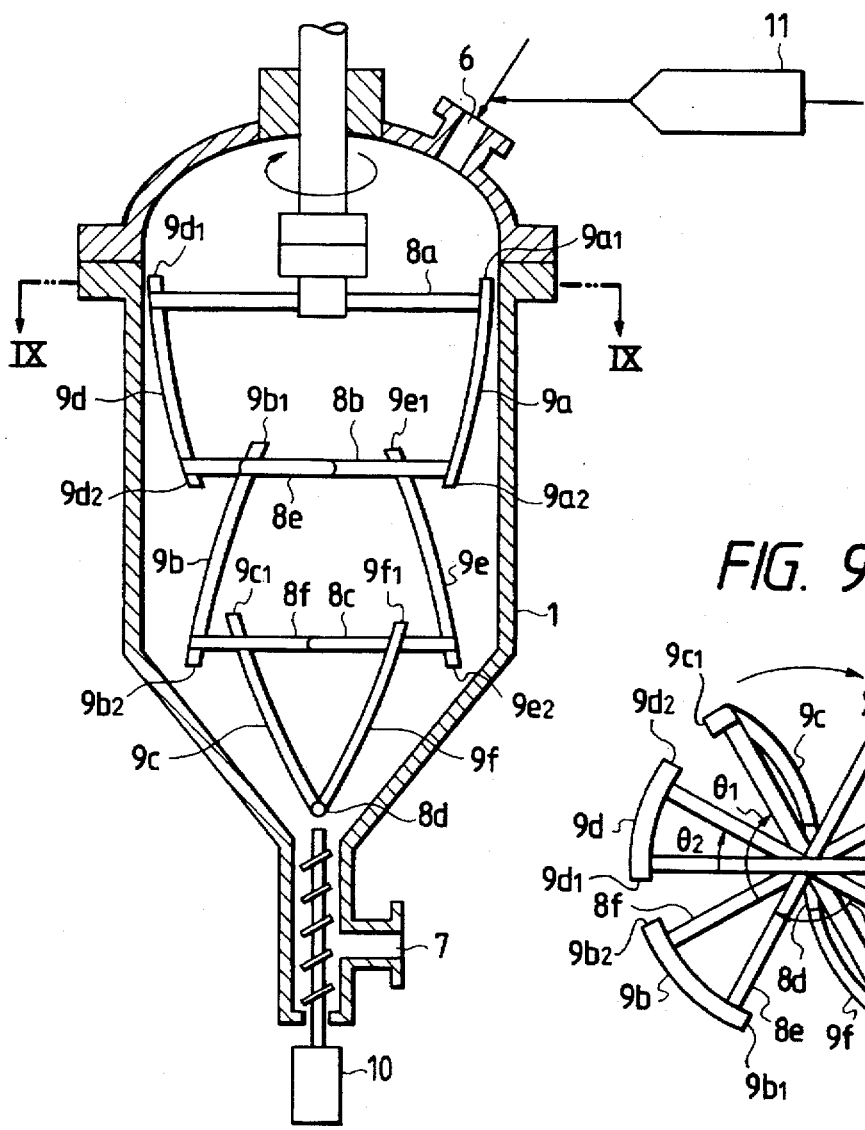
FIG. 8 is a schematic cross-sectional view of an apparatus for producing high viscosity materials according to still further embodiment of the present invention.
Figure 9:
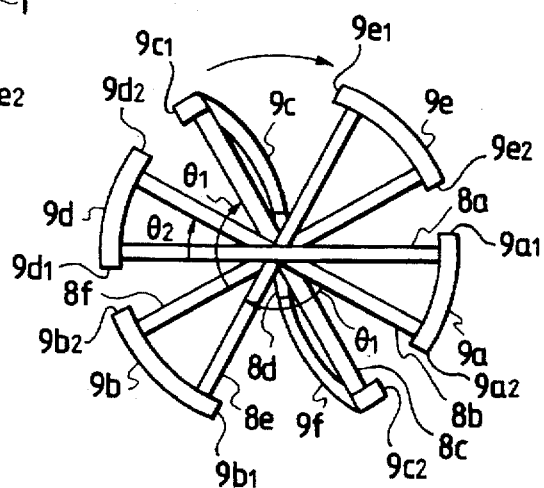
FIG. 9 is a section view along the line IX—IX of FIG. 8.

In the embodiment of FIGS. 8 and 9, the basic constituent members and the operation are the same as those of the above-mentioned embodiment, and the same effects are obtained. In FIGS. 8 and 9, lower portion of the agitator vessel body 1 is formed in a conical shape, with the upper portion thereof being of a rectangular shape. Due to this construction, the liquids treated can be easily discharged and within reduced periods of time.

According to the embodiment of FIGS. 8 and 9, a discharge device 10 is provided at the vertex of the conical portion, and a pressurizing device 11 is provided on the upstream side of the feed port 6 to pressurize the interior of the vessel. The agitator blade members $8a$ and $8b$ are twisted in the direction of rotation by the angle $\theta_2$ with the center of the vessel as a center of rotation, and are coupled to the vertically oriented members $9a$ and $9d$ that are so formed as to evenly scrape the wall surface of the vessel. The next agitator blade constituent element has a similar shape and the horizontally oriented members $8b$ and $8e$ are coupled for maintaining an angle $\theta_1$. The succeeding agitator blade constituent elements are also connected in the same manner to form agitator blades. According to the embodiment of FIGS. 8 and 9, the agitator blades are rotated in a direction opposite to that of the reaction operation when the liquids are to be discharged after the completion of the agitation or the reaction operation and, at the same time, the discharge device 10 is operated and the interior of the vessel is pressurized by the pressurizing device 11 to carry out the discharge processing. According to this system which rotates the agitator blades in the reverse direction, the liquids to be treated are pushed down along the wall surface of the vessel and are concentrated in the lower portion of the vessel. Further, since the interior of the vessel has been pressurized, the liquids can be easily supplied into the discharge device 10 enabling the liquids to be discharged in reduced periods of time.

Figure 10:
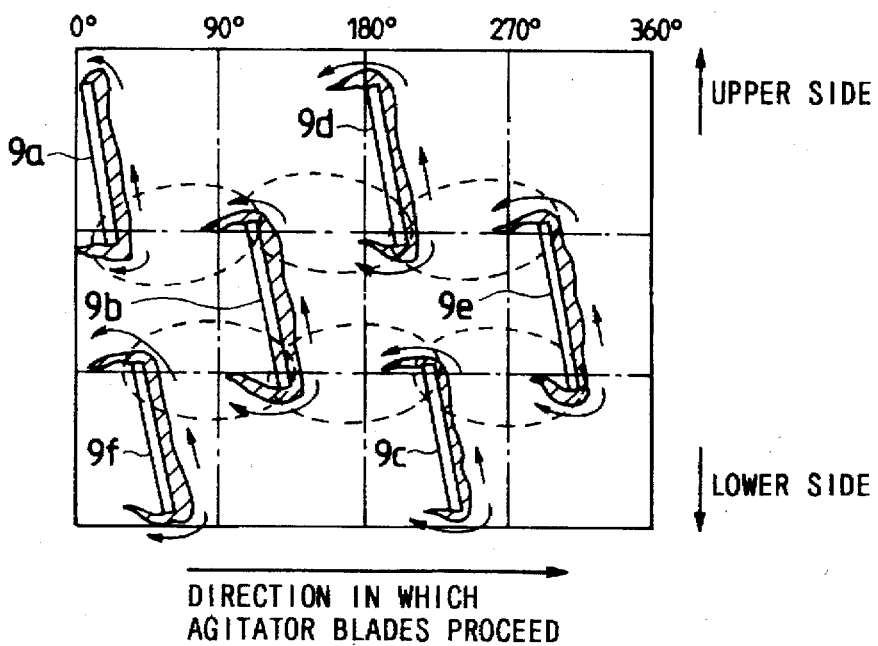
FIG. 10 is an expansion plan of the circumferential wall surface of a cylinder of FIG. 8.

According to the embodiment of FIGS. 8 and 9 the ends $9a_1$, $9a_2$, $9d_1$, $9d_2$, $9b_1$, $9b_2$, $9e_1$, $9e_2$, $9c_1$, $9f_1$ on both sides of the agitator blade members of the agitator blade constituting members that scrape the wall surface of the vessel are extended upwardly and downwardly beyond the portions where they are coupled to the horizontally oriented agitator blade members in order to constitute agitator blade constituent elements which are then coupled together to construct the agitator blades. Described below is the stream of the liquids near the wall surface of the vessel of the thus constituted erected agitator device. FIG. 10 illustrates the case of when the circumferential wall surface of the cylinder of the apparatus of FIG. 8 is expanded into a plan. The contents of FIG. 10 are nearly the same as those FIG. 5 and are not described here in detail. In this embodiment, in particular, the agitator blade members $9a$, $9d$, $9b$, $9e$, $9f$ and $9c$ are distributed in the vessel and the ends of the agitator blade members are bent inwardly of the trajectory of the blades so that the liquids rearwardly overflowing over both ends of the agitator blade members will mix more easily with the liquids in front of the succeeding agitator blade members contributing to improving homogeneous agitation and mixing performance in the whole vessel. If the ends $9a_1$, $9d_1$ of the blade members are mounted in directions opposite to the inclinations of the blade members $9a$ and $9d$, the liquids are prevented from adhering to the upper portion of the vessel.

Figure 11:
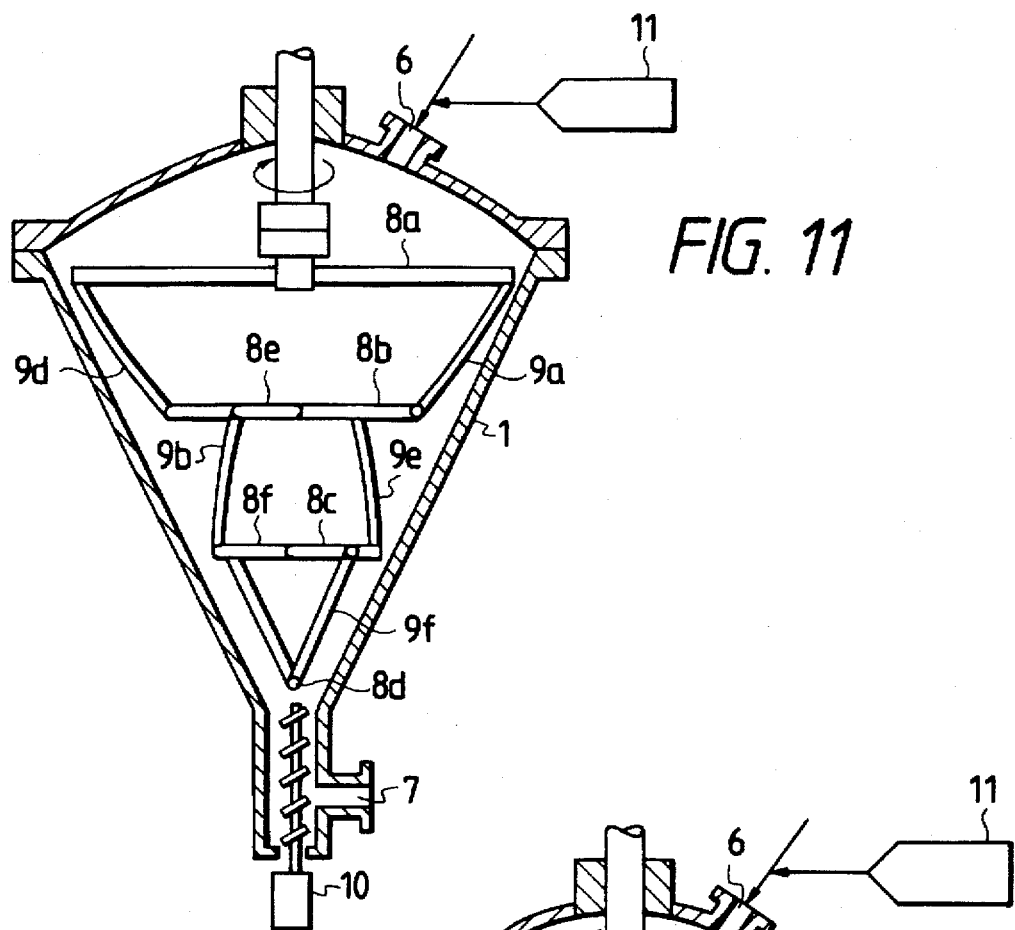
FIG. 11 is a schematic cross-sectional view of an apparatus for producing high viscosity materials according to yet further embodiment of the present invention.

In the embodiment of FIG. 11, the basic constituent members and the operation are the same as those of the aforementioned embodiment, and the same effects are obtained. In the embodiment of FIG. 11, the agitating vessel body 1 is formed in a conical shape, and the agitator blades are also formed in a conical shape to run along the wall surface of the vessel. By employing the shape as contemplated in the embodiment of FIG. 11, the liquids to be treated are spread along the wall surface of the vessel. The vessel in the upper portion thereof has a sectional area greater than that of the cylindrical vessel, and the surface area of the liquids increases per a volume, making it possible to improve surface renewing function. In the polymerization reaction operation of the highly viscous liquids, the surface renewing performance determines the reaction time, and improvements in the performance contribute to shortening the reaction time.

Figure 12:
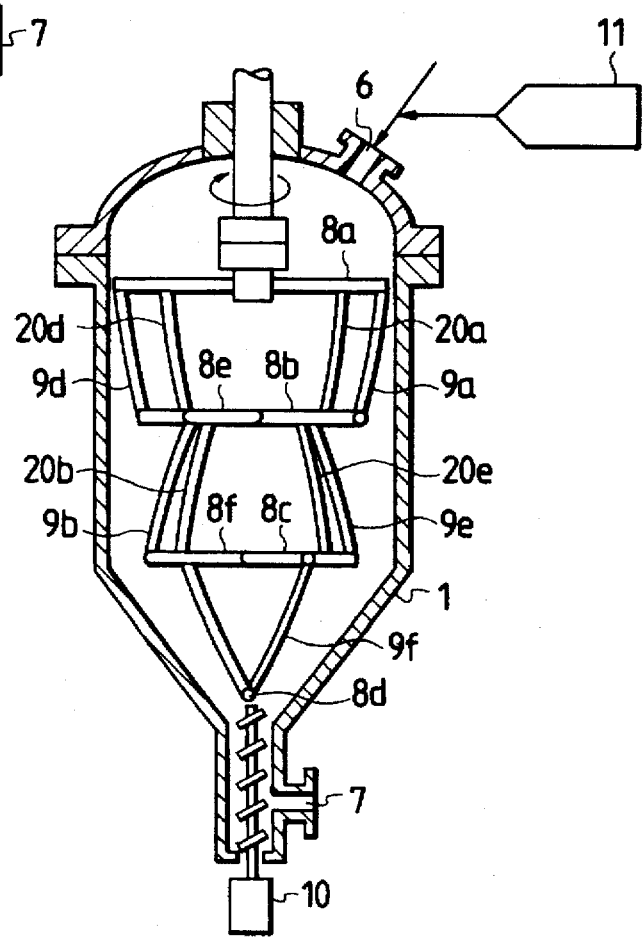
FIG. 12 is a schematic cross-sectional view of an apparatus for producing high viscosity materials according to a further embodiment of the present invention.

In the embodiment of FIG. 12, the basic constituent members and the operation are the same as those of the aforementioned embodiment and the same effects are obtained. In this embodiment, vertically oriented reinforcing members $20a$ and $20d$ are provided in a bar rectangular frame of the agitator blade constituent element and reinforcing members $20e$ and $20b$ are provided in another bar rectangular frame, in order to increase the rigidity of the agitator blade constituent elements. By providing the reinforcing members, it is possible to increase the strength of the agitator blades, to improve agitation and mixing in the rectangular frames and hence to improve the agitation and mixing performance.

Figure 13:
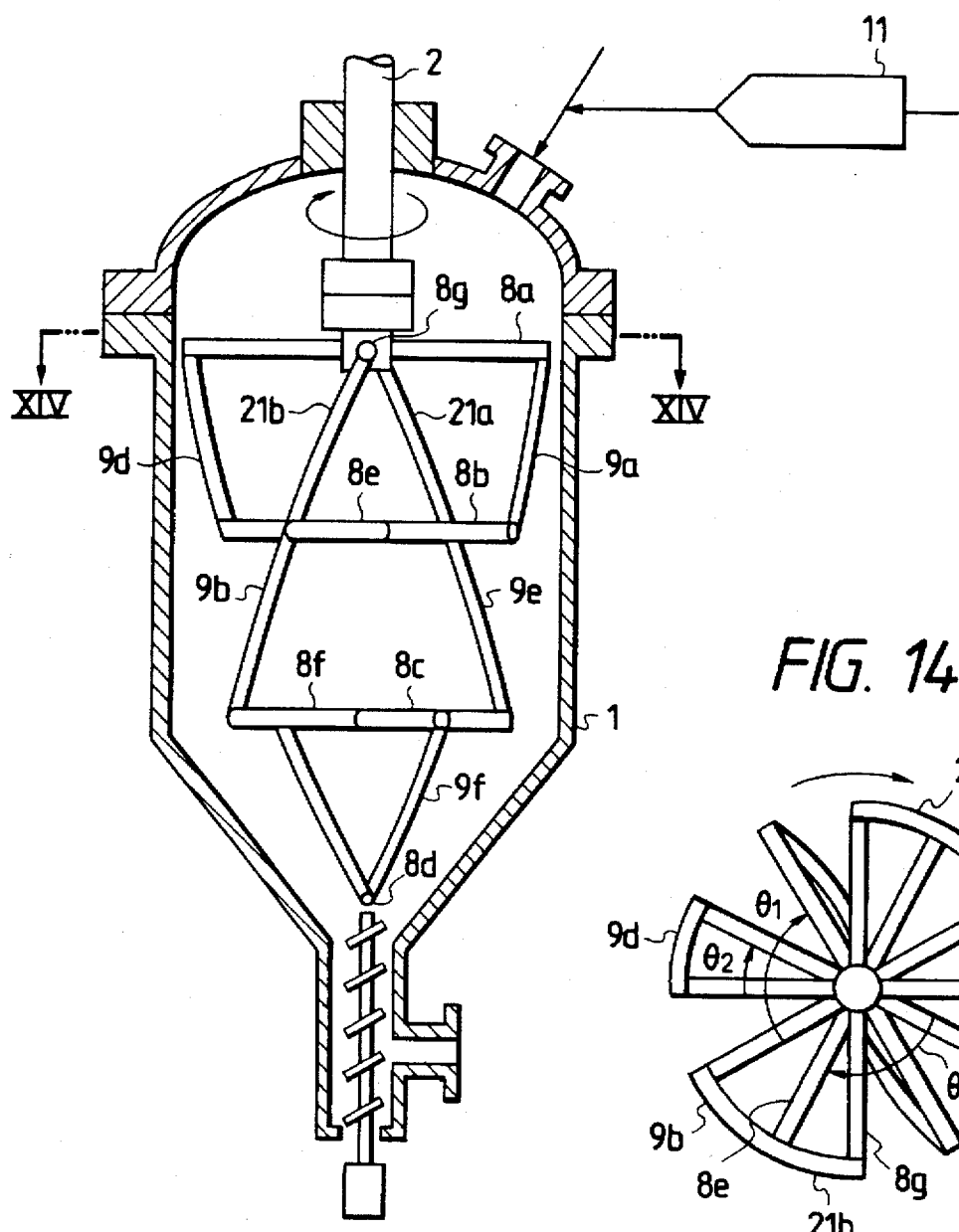
FIG. 13 is a schematic cross-sectional view of an apparatus for producing high viscosity materials according to another embodiment of the present invention.
Figure 14:
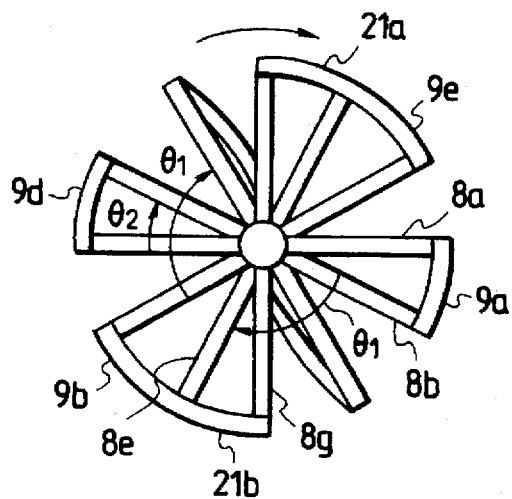
FIG. 14 is a section view along the line XIV—XIV of FIG. 13.

In the embodiment of FIGS. 13 and 14, the basic constituent members and the operation are the same as those of the aforementioned embodiment and the same effects are obtained. In the embodiment of FIGS. 13 and 14, among the agitator blade constituent elements, the two sets of agitator blade constituent elements $8a$, $9a$, $8b$, $9b$ and $8g$, $21b$, $8e$, $21a$ are coupled to a portion connected to the rotational lug shaft 2 in order to constitute the agitator blades. This construction has an increased number of members for transmitting the force of agitation, and the agitator blades exhibit increased rigidity. Further, a link (not shown) may be provided between the agitator blade constituent elements 8b and 8c to obtain the same effects.

In the embodiment of FIGS. 15 and 16, the basic constituent members and the operation are the same as those of the aforementioned embodiments, and the same effects are obtained. As shown in FIGS. 15 and 16, the agitator blade constituent element is constituted by twisting the horizontally oriented agitator blade members 8a and 8b by a phase angle $\theta_2$ in a direction opposite to the rotational direction among the agitator blade constituent elements in the upper portion of the agitator blades, such that the liquids scraped from the wall surface of the vessel will not adhere to the upper portion of the vessel which makes it difficult to carry out the agitation homogeneously at the time of agitating and mixing the liquids having several kpa•s (several tens of thousand poises). In this construction, the agitator blade members 9a and 9d that scrape the wall surface of the agitator vessel are tilted so as to push the liquids downwardly along the wall surface of the vessel when the agitator blades are rotated in the direction of operation. Therefore, the lower agitator blade constituent element works to the liquids upwardly along the wall surface of the vessel and the upper agitator blade constituent element works to push the liquids downwardly, i.e., the liquids are prevented from staying in the upper portion of the vessel, and favorable agitation and mixing performance is obtained.

Figure 17:
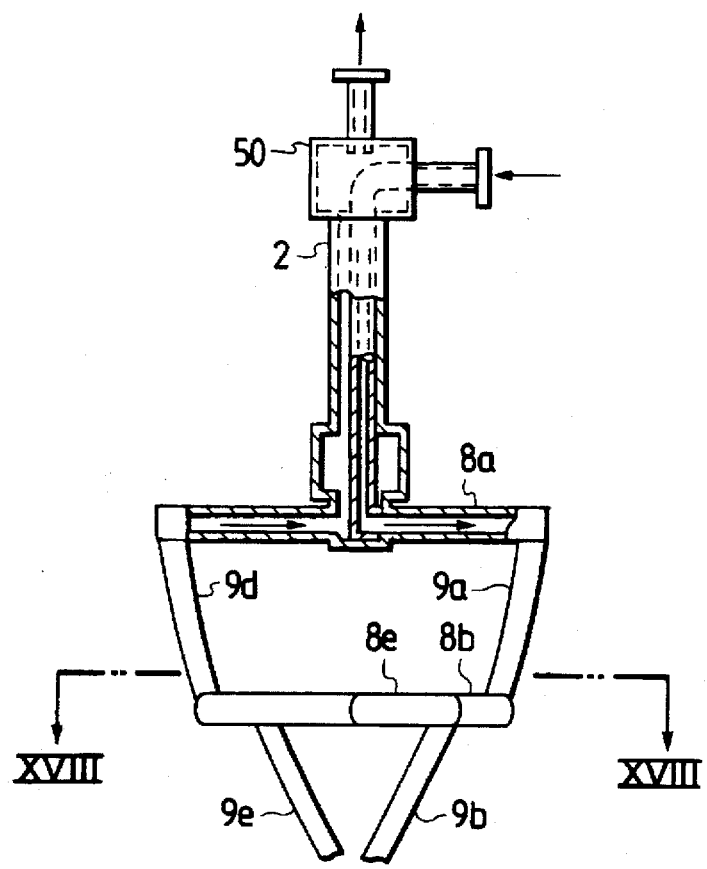
FIG. 17 is a schematic cross-sectional view of an apparatus for producing high viscosity materials according to still further embodiment of the present invention.
Figure 18:
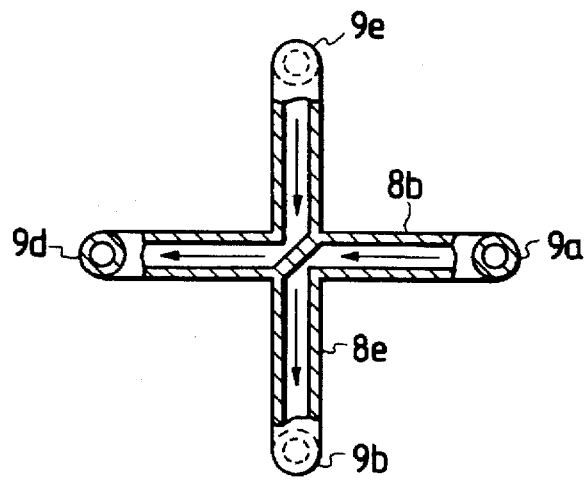
FIG. 18 is a section view along the line XVIII—XVIII of FIG. 17.

According to the embodiment of FIGS. 17 and 18, the agitator blade constituent member is hollow, the rotational lug shaft 2 is of a double tube construction, and a rotary joint 50 is provided at the upper end of the rotational lug shaft 2. In the embodiment of FIGS. 17 and 18, the heat transfer medium is allowed to flow from the rotary joint 50 through the agitator blade constituent members 8a, 9a, 8b, 8e, 9b, 9e, 8e, 8b and 9d, to quickly heat and cool the liquids to be treated and to shorten the time of polymerization.

When the treated liquids are to be discharged, the heat medium is supplied into the agitator blade constituent members to decrease the amounts of liquids that adhere onto the surfaces of the agitator blades.

According to a further embodiment, a change in the viscosity of liquids to be treated is detected by detecting the rotational torque of the rotational lug shaft 2 in order to change the number of revolutions of the rotational lug shaft 2 in dependence upon the viscosity. According to this embodiment, the number of revolutions is increased when the liquids have a small viscosity to effect powerful agitation, and the number of revolutions is decreased when the viscosity is large to prevent excess of torque. In this case, the viscosity of the liquids can also be detected by sampling the liquids through a separate nozzle (not shown) after every predetermined period of time to directly measure them instead of detecting the rotational torque.

Figure 19:
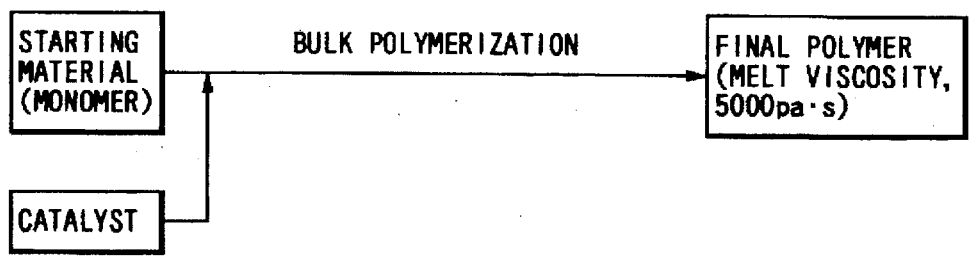
FIG. 19 is a flow diagram of the production process for producing high performance resins (high viscosity materials) according to an embodiment of the present invention.

Described below in conjunction with FIGS. 8, 9 and 19 is a further embodiment of the method of producing high viscosity material using the apparatus of the invention. As shown in FIG. 19, a monomer which is a starting material of the high viscosity material and a catalyst are mixed together to produce a desired final polymer through the bulk polymerization by effecting the polyaddition reaction or the polycondensation reaction. The high performance resin has an increased degree of polymerization and an increased melting viscosity and, hence, the melting viscosity of the final polymer increases up to several kpa•s (several tens of thousand poises). If a liquid having several kpa•s (several tens of thousand poises) is treated using an ordinary agitator apparatus, polymerization degree of the product greatly varies due to poor mixing and agitating performance, and the quality is degraded conspicuously. Using the apparatus for agitating high viscosity material shown in FIG. 8, the process is carried out up to a point of obtaining the final polymer without deteriorating the agitating performance. The construction and action of the apparatus for agitating high viscosity material is shown in FIGS. 8 and 9.

Figure 20:
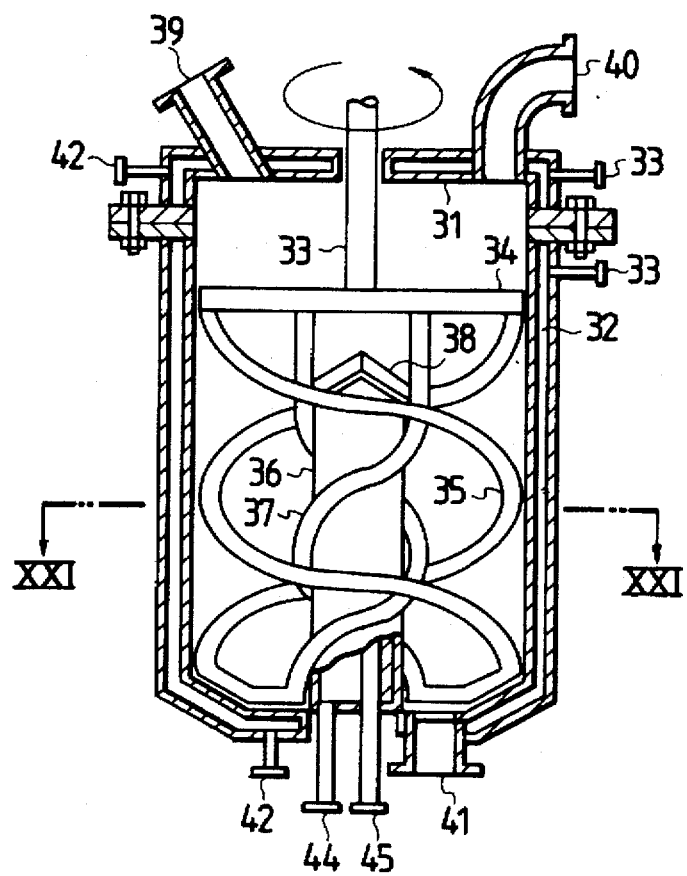
FIG. 20 is a schematic cross-sectional view of an erected double helical-blade agitating apparatus according to another embodiment of the present invention.
Figure 21:
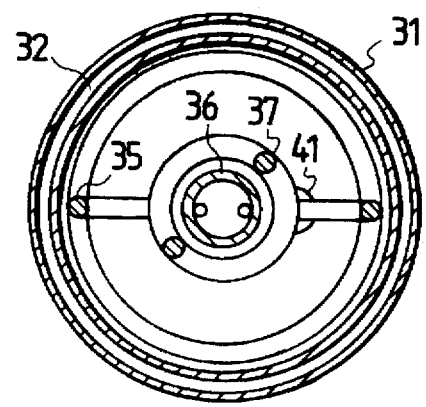
FIG. 21 is a section view along the line XXI—XXI of FIG. 20.

Described below is a still further embodiment for producing high viscosity materials according to the present invention, in which the apparatus for treating high viscosity material is modified into an erected double helical-blade apparatus as shown in FIGS. 20 and 21.

As shown in FIGS. 20 and 21 a body of an erected double helical-blade agitator apparatus is surrounded by a jacket 32 for heating or cooling. A rotational lug shaft 33 is provided at the upper portion of the body 31, and an arm 34 is attached to the lower end of the rotational lug shaft 33, with two outer helical blades 35 being fastened to both ends of the arm 34. The outer helical blades 35 are mounted close to the inner wall surface and the bottom surface of the body 31 to scrape, agitate and mix the liquids to be treated near the inner wall surface of the container. At the center of the body 31, a concentric cylinder 36 is provided, with the cylinder 36 being fastened to the bottom of the body 31. An inner helical blade 37 is mounted on the inside of the arm 34 to rotate along the circumferential wall surface of the concentric cylinder 36. A scraper rod 38 is mounted on the upper inner side of the inner helical blade 37 to scrape the top areas of the concentrical cylinder 36.

A nozzle 39 for introducing the starting materials and a nozzle 40 for emitting volatile substances are provided at an upper portion of the body 31 of the container, and a nozzle 41 for discharging the treated liquids is provided at a lower portion of the body 31. Further, a nozzle 42 for introducing the heat transfer medium and a nozzle 43 for discharging the heat transfer medium are provided at the lower and upper portions of the jacket 32 surrounding the body 31. As shown in FIG. 20, the concentric cylinder 36 is hollow and is provided at its lower portion with a nozzle for introducing the heat transfer medium to supply it to the interior of the cylinder 36 and with a nozzle 45 for discharging the heat transfer medium.

According to the embodiment of FIGS. 20 and 21, the outer helical blade and the inner helical blade 37 are twisted in the opposite directions relative to each other, the liquids to be treated are scraped up on the outer side by rotation of the lug shaft 33, and the liquids to be treated are scraped down on the inner side, such that the liquids are evenly agitated in the container. The body 31 is divided into the upper and lower portions by a flange.

Described below are the functions and effects of the present invention of when the highly viscous liquids are agitated and polymerized using the thus constituted apparatus.

When, for example, a polyethylene terephthalate is to be subjected to the polycondensation using the apparatus of the invention, starting materials such as terephthalic acid, ethylene glycol and the like are supplied through the nozzle 39 for introducing the starting materials, and are agitated and mixed together while being heated at 265° C. to 290° C. The liquids having an increased viscosity are scraped up by the outer helical blade 35 and is scraped down by the inner helical blade 37; i.e., the liquids smoothly circulate in the body 31 and are agitated and mixed. The heat transfer medium is supplied into the jacket 32 surrounding the body 31 and into the concentric cylinder 36 to heat the liquids at the time of starting the agitation and to remove the heat of reaction that is produced as the reaction proceeds. Volatile substances such as ethylene glycol and the like formed by the reaction vaporize from the surface of the liquids that are treated as the pressure in the body 31 is reduced from 0.1 Torr to 10 Torr, and are removed out of the system through the outlet nozzle 40.

According to this embodiment as described above, the liquids to be treated are scraped off and pushed down at all times in the central portion of the body 31 due to the interaction between the inner helical blade 37 and the concentric cylinder 36 provided on the inside thereof. Therefore, residues are not formed since the liquids do not rotate together with the agitator blades that often took place in the conventional apparatus, and the entire circulation flow is promoted in the body making it possible to achieve homogeneous mixing in the container.

Circulation flow of the liquids in the body 31 is promoted due to the interaction between the inner helical blade 37 and the concentric cylinder 36, whereby the degree of surface renewing is enhanced, and the deaerating rate of ethylene glycol is hightened to shorten the time of polymerization.

According to this embodiment, furthermore, the heat transfer medium is also supplied into the concentric cylinder 36 enabling the heat transfer area to be increased compared with that of the conventional apparatus.

As described above, the treated liquids which are homogeneously agitated, mixed, renewed for their surfaces, which are sufficiently heated or from which the heat is removed, are taken out of the system through the outlet nozzle 41.

According to a further embodiment of the present invention, the rotational lug shaft 33 is constituted by two concentric rotational lug shafts 33A and 33B to independently drive the inner helical blade 37 and the outer helical blade 35 via separate gears 60A and 60B. According to this embodiment, the number of revolutions of the inner helical blade 37 can be increased to become equal to the peripheral speed of the outer helical blade 35 in order to increase the speed of circulation of the liquids to be treated in the body 31, or the inner helical blade 37 or the outer helical blade 35 is rotated in the reverse direction when the liquids are to be discharged such that both the inner and outer helical blades 37 and 35 are rotated to scrape down the liquids in order to quickly discharge the liquids having high viscosity.

Figure 22:
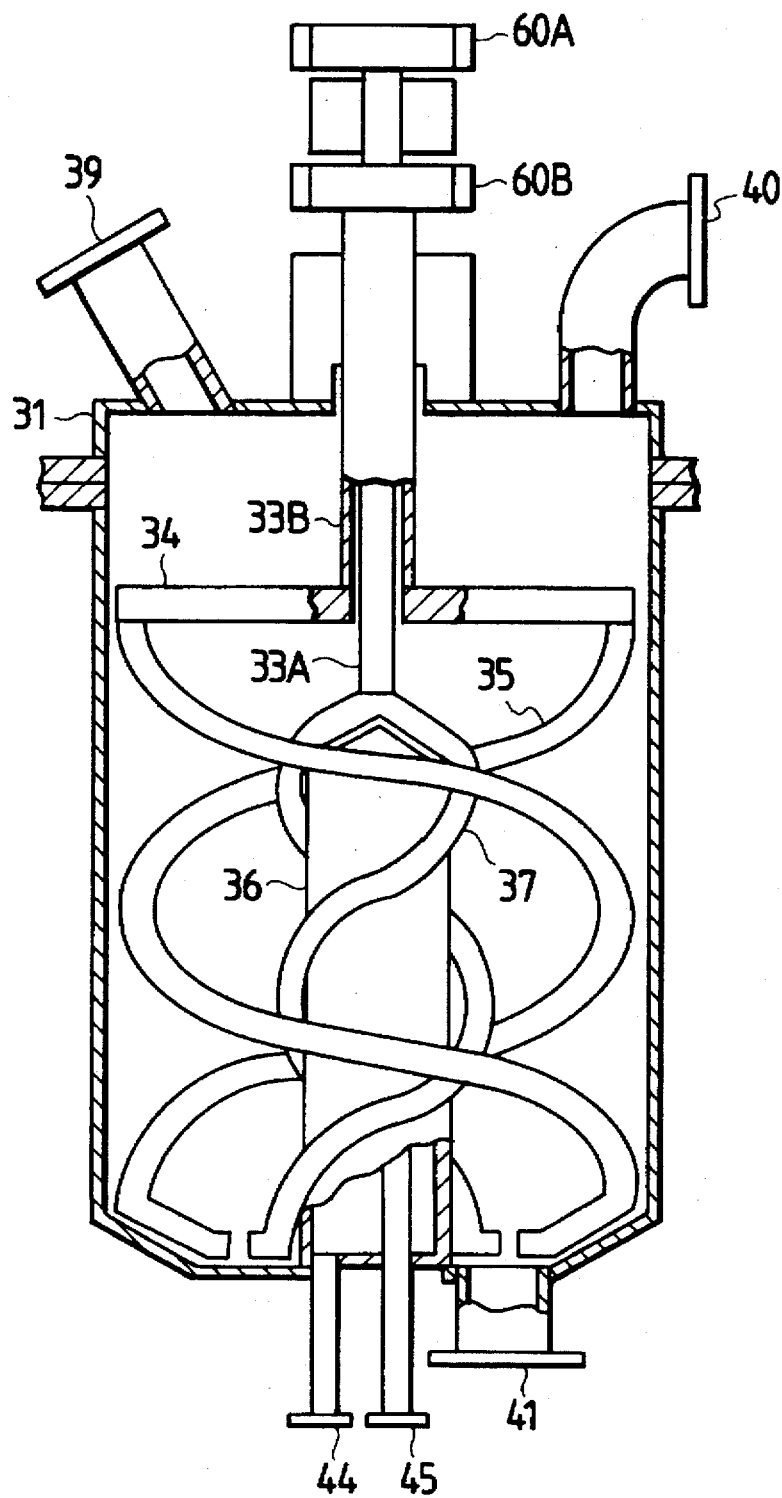
FIG. 22 is a schematic cross-sectional view of embodiment of the present invention.

Using the erected double helical-blade apparatus shown in FIG. 20 or 22, it is possible to carry out the polymerization reaction until the final polymer is obtained.

Using the agitator blades that form the frame members or using the erected double helical blades of the present invention, therefore, the liquids to be treated can be circulated throughout the entire vessel, whereby no residues of the liquids are formed and the liquids having high viscosity are favorably agitated and mixed together. Therefore, if the polymerization reaction is carried out using the agitator apparatus or the erected double helical blades, there is obtained a final polymer having uniform polymerization degree. It is further allowed to produce the final polymer using one agitator apparatus from the start of the polymerization reaction.

Figure 23:
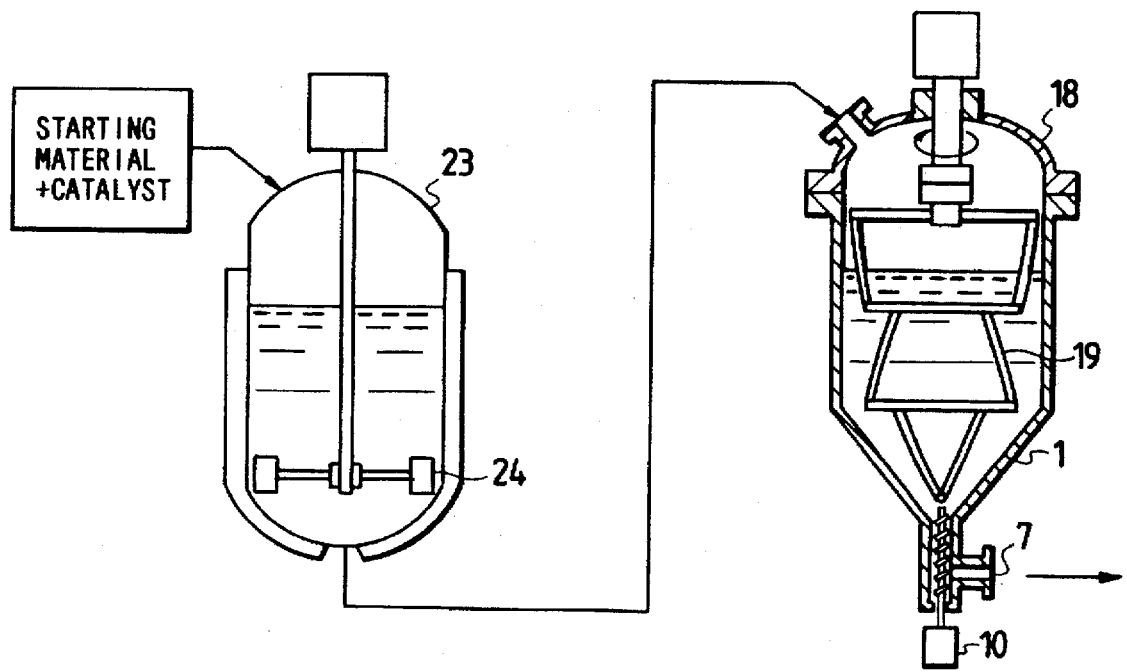
FIG. 23 is a schematic cross-sectional view of a bulk polymerization apparatus according to another embodiment of the present invention.

The embodiment of FIG. 23 is adapted to produce the desired final polymer through the bulk polymerization by subjecting the high performance resin (high viscosity material) to the polyaddition reaction or to the polycondensation reaction using a prepolymerization apparatus 23 and the agitator apparatus 18 explained with reference to FIG. 8 or 20. According to this embodiment, the low viscosity liquids of before being polymerized are treated in the prepolymerization apparatus 23 equipped with a conventional agitator blade 24 for low viscosities, and the liquids having intermediate viscosity to final viscosity are treated in the agitator vessel 1 of the aggitator apparatus equipped with an agitator blade 19 for high viscosities. The agitator blade 19 for high viscosities have the same construction and actions as those explained in conjunction with FIG. 8 or FIGS. 20 and 22. Using the aforementioned construction, the high performance resins (high viscosity materials) are produced through the bulk polymerization process only to simplify the process.

According to the present invention, the interior of the vessel is evenly scraped by rectangular frame members to obtain favorable agitating and mixing performance without forming residues. Further, since there is no rotary shaft together which the liquids to be treated rotate, quality of the liquids being treated is not deteriorated by the agitation and mixing. Moreover, the rectangular frame members work to scrape the liquids being treated and generate a great circulation flow in the vessel to enhance the agitating and mixing performance.

Further, since the rectangular frame members are rotated while being coupled together, the liquids are agitated in a complex manner over the whole vessel, whereby the ratio of the surface areas of the liquids per a volume of the vessel increases contributing to increasing the surface renewing function and increasing performance for deaerating volatile components. Moreover, with the agitator blade being rotated in the reverse direction, the liquids to be treated can be concentrated in the lower portion of the vessel enabling the treated liquid to be discharged in reduced periods of time.

According to the present invention, furthermore, the high performance resins (high viscosity materials) are produced through the bulk polymerization only, and the process of production is simplified.

Further, facilities for producing high performance resins can be constructed at reduced prices. The reaction time required for producing high performance resins can be shortened, too.

We claim:

1. An apparatus for producing a high viscosity material comprising:

a cylindrical or conical container for holding said material; and an agitating blade located within the container and having at least first and second frame members located vertically with respect to one another within the container to form first and second stages, wherein each of said first and second frame members comprises:

a first horizontal blade;

a second horizontal blade vertically displaced within the container from the first horizontal blade;

a first vertical blade extending between one end of the first horizontal blade and one end of the second horizontal blade; and a second vertical blade extending between the other end of the first horizontal blade and the other end of the second horizontal blade; and a rotatable lug shaft connected to a midpoint of the first horizontal blade of the first frame member to rotate said plurality of frame members as a unit within the container, wherein a central part of each of said first and second frame members between the first horizontal blade, the second horizontal blade, and the first and second vertical blades is open space without any central shaft member extending through said central portion, wherein the first horizontal blade of the second frame member lies on the same horizontal plane and intersects the second horizontal blade of the first frame member, wherein the first and second frame members are each dimensioned so that the first and second vertical blades of each of said first and second frame members scrape inner wall surfaces of said container, and wherein the apparatus for producing a high viscosity material includes means for generating small circulation paths and a large circulation path which cooperate with one another to provide a common mass flow in the vertical direction upwardly along the inner wall of the container and downwardly through the central portion of each of the frame members when the agitating blade is used to treat a mass of liquid, said means comprising each of said vertical blades being rearwardly inclined relative to the direction in which the agitating blade proceeds so that one part of a mass of liquid to be treated by the agitating blade overflows rearwardly beyond upper and lower ends of each said vertical blade to create the small circulation path whereas another part of said mass of liquid is moved upwardly along each said vertical blade from said second frame member to said first frame member to create the large circulation path.

2. An apparatus according to claim 1, wherein the first horizontal blade and the second horizontal blade of each of said frame members are angularly displaced from one another.

3. An apparatus according to claim 1, wherein the first horizontal blade of the second frame member and the second horizontal blade of the first frame member are substantially perpendicular to one another.

4. An apparatus according to claim 1, wherein the first and second vertical blades of each of said frame members helically extend between the first and second horizontal blades to which they are connected.

5. An apparatus according to claim 1, wherein each of said first and second horizontal blades of each of said frame members is substantially the same length.

6. An apparatus according to claim 1, wherein each of the first and second vertical blades of each of said frame members is substantially the same length.

7. An apparatus according to claim 5, wherein each of the first and second vertical blades of each of said frame members is substantially the same length.

8. An apparatus according to claim 1, wherein within each stage the first horizontal blade has a greater length than the second horizontal blade.

9. An apparatus according to claim 1, further comprising a third one of said frame members having a first horizontal blade which lies on the same horizontal plane and intersects the second horizontal blade of the second frame member.

10. An apparatus for producing a high viscosity material having a viscosity of 10,000 poises or greater comprising:

a cylindrical or conical container for holding said material; and an agitating blade located within the container and having at least first and second frame members located vertically with respect to one another within the container to form first and second stages, wherein each of said first and second frame members comprises:

a first horizontal blade;

a second horizontal blade vertically displaced within the container from the first horizontal blade;

a first vertical blade extending between one end of the first horizontal blade and one end of the second horizontal blade; and a second vertical blade extending between the other end of the first horizontal blade and the other end of the second horizontal blade; and a rotatable lug shaft connected to a midpoint of the first horizontal blade of the first frame member to rotate said plurality of frame members as a unit within the container, wherein a central part of each of said first and second frame members between the first horizontal blade, the second horizontal blade, and the first and second vertical blades is open space without any central shaft member extending through said central portion, wherein the first horizontal blade of the second frame member lies on the same horizontal plane and intersects the second horizontal blade of the first frame member, wherein the first and second frame members are each dimensioned so that the first and second vertical blades of each of said first and second frame members scrape inner wall surfaces of said container, and means for creating a large circulation path and a plurality of small circulation paths which cooperate with the large circulation path to provide a common mass flow in the vertical direction upwardly along the inner wall of the container and downwardly through the central portion of each of the frame members, said high viscosity material having a viscosity of 10,000 poises or greater, wherein said means comprises each of said vertical blades having a sufficient stiffness to move through said high viscosity material without substantial flexing and being rearwardly inclined relative to the direction in which the agitating blade proceeds so that one part of a mass of liquid to be treated by the agitating blade overflows rearwardly beyond upper and lower ends of each said vertical blade to create the small circulation paths whereas another part of said mass of liquid is moved upwardly along each said vertical blade from said second frame member to said first frame member to create the large circulation path.

11. An apparatus according to claim 10, wherein the first and second vertical blades of each of said frame members helically extend between the first and second horizontal blades to which they are connected.

12. An apparatus according to claim 1, wherein each of said first and second horizontal blades of each of said frame members is substantially the same length.

13. An apparatus according to claim 12, wherein each of the first and second vertical blades of each of said frame members is substantially the same length.

14. An apparatus according to claim 10, wherein within each stage the first horizontal blade has a greater length than the second horizontal blade.

15. An apparatus according to claim 10, further comprising a third one of said frame members having a first horizontal blade which lies on the same horizontal plane and intersects the second horizontal blade of the second frame member.

* * * * *